Figure 1:
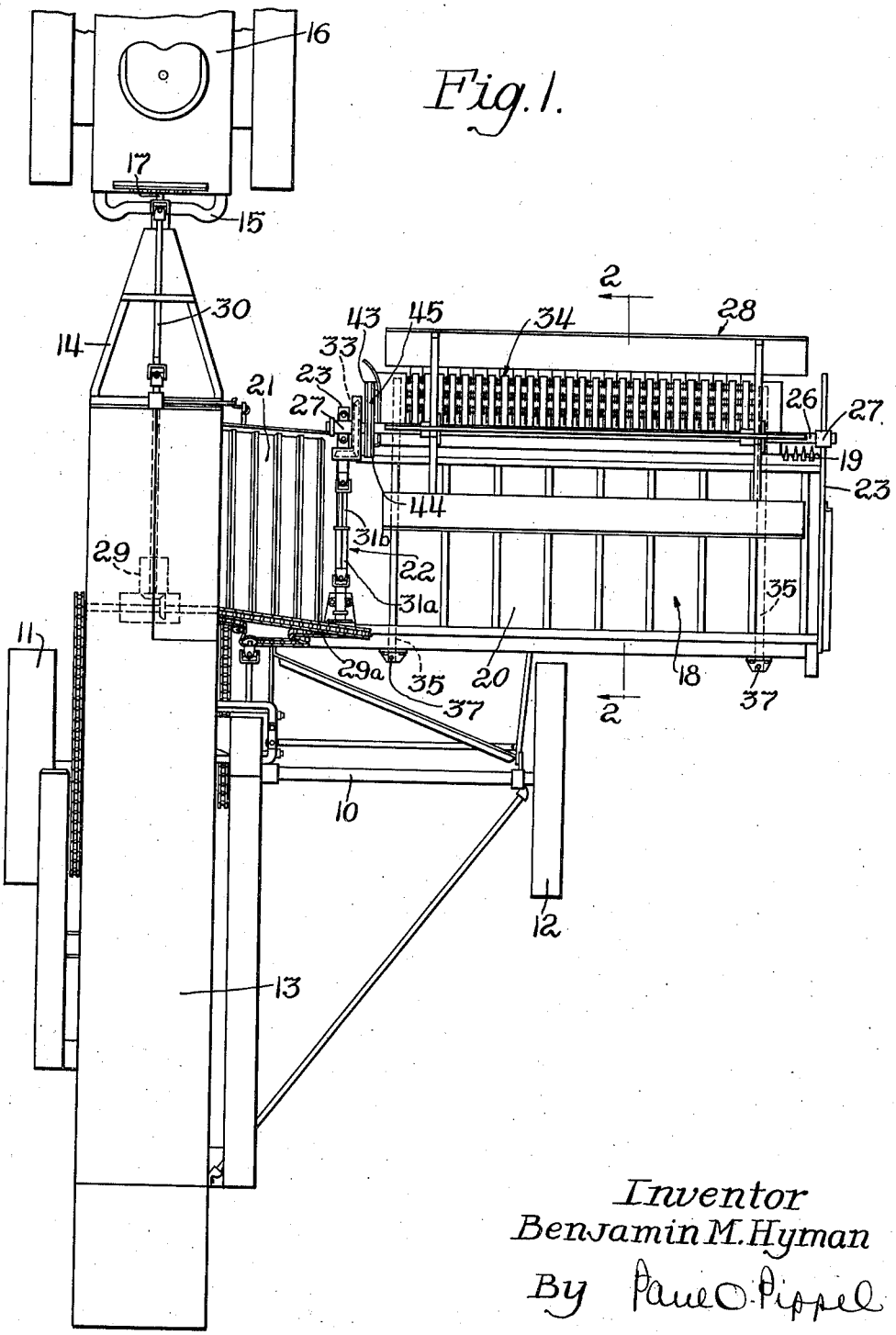

Aug. 12, 1941.   B. M. HYMAN   2,252,376
PICKUP ATTACHMENT FOR HARVESTER-THRESHERS
Filed Oct. 9, 1939   2 Sheets-Sheet 1

Inventor
Benjamin M. Hyman
By Paul O. Pippel
Atty.

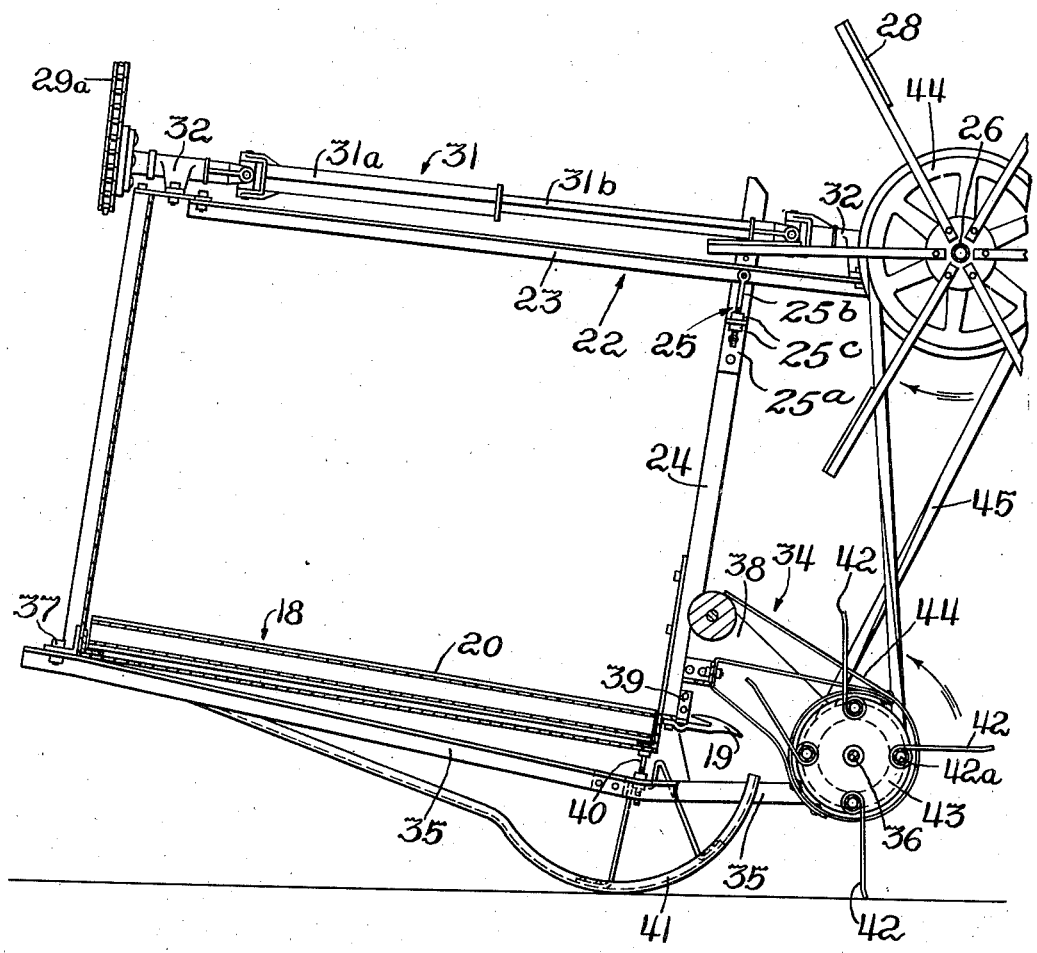

Patented Aug. 12, 1941

2,252,376

UNITED STATES PATENT OFFICE 2,252,376

PICKUP ATTACHMENT FOR HARVESTER-THRESHERS

Benjamin M. Hyman, Moline, Ill., assignor to International Harvester Company, a corporation of New Jersey Application October 9, 1939, Serial No. 298,553

2 Claims. (Cl. 56—364)

The present invention relates to harvesters.

More specifically it relates to the drive for a pick-up attachment mounted on the platform of the harvester.

Normally, a combination harvester thresher is used for cutting grain and for threshing it immediately thereafter. Many times, however, the grain needs to be cured before it is threshed, and in this case it is previously cut and left in windrows in the field. Any suitable cutting device may be used for this operation. After the crop has been cut and cured and is in windrows in the field it is picked up by a machine which includes a thresher and a pick-up attachment substituted for the usual cutter bar. The crop is picked up by the pick-up attachment, and is conveyed therefrom to the thresher and separator where it is acted on in the usual manner.

Heretofore, in mounting a pick-up attachment on a platform or header special drives for the pick-up have been provided. The drives for the pick-up, when made specially for the pick-up, require much time to install and add greatly to the cost of the machine.

The harvesters, in wide use at the present time, have a reel mounted on the header or platform. This reel is provided on all machines and is driven so as to urge the grain onto the platform or header. The drive for this reel is provided on the machines when they are made.

It is, therefore, the object of the present invention to utilize the reel drive on the harvester to drive the pick-up attachment.

Another object of the present invention is to provide a novel drive for a pick-up attachment for a harvester that can be easily installed and will not add materially to the cost of the machine.

Another object of the invention is to provide a drive for a pick-up device which can be readily adjusted.

Another object of the invention is to provide a pick-up that can readily be attached on a harvester header.

Other objects and advantages will become apparent to those skilled in the art as the description of the improved machine continues.

The improved drive for the pick-up is established by providing a pulley or sprocket on the reel shaft of the harvester. The pick-up attachment is mounted on the header or platform by a novel, quick, attachable means, and a pulley or sprocket for the pick-up is alined with the pulley on the reel shaft. A belt or chain connects the two pulleys, and in this way the drive may be transmitted from the reel to the pick-up. The reel can be adjusted vertically so that the drive belt or chain can be adjusted to the proper tension.

An illustrative embodiment of the invention is shown in the drawings in which:

Figure 1 is a plan view of a harvester thresher, showing the drive for the pick-up attachment; and, Figure 2 is a sectional view taken along the line 2—2 of Figure 1.

The harvester used to illustrate the invention is of the type shown in detail in Patent No. 1,842,764 to Raney et al., issued January 26, 1932. Only the parts of the machine pertinent to the present invention will be described.

The harvester, as illustrated, is supported on a transversely disposed axle member 10, on which is rotatably mounted a main wheel 11 and a grain wheel 12. A separator body 13 is supported on the axle 10 in the usual manner. The separator body 13 contains the usual threshing mechanism, not shown, but well understood by those skilled in the art. The forward end of the body 13 is provided with a draft element 14 which is connected to the drawbar 15 of a tractor 16. The drawbar of the tractor supports the front end of the harvester. The tractor 16 has the usual power take-off shaft 17, the purpose of which will be described later on.

Supported on the axle 10 and extending laterally from the separator body 13 is the usual platform or header 18. The platform comprises a cutter bar 19 and an endless conveyer 20. An inclined feed conveyer 21 cooperates with the endless conveyer 20, and feeds the crop into the separator body 13.

A reel supporting structure 22 is mounted on the platform or header 18, and comprises forwardly extending members 23. An upwardly extending part 24 is connected to the platform 18, and is adjustably connected at 25 to the member 23. The adjustable connection 25 consists of a bracket 25a which is secured to the upwardly extending part 24. The bracket 25a is provided with an opening through which one end of a bolt 25b is inserted that is pivotally connected at its other end to the forwardly extending member 23. Nuts 25c provided on the bolt 25b at either side of the bracket 25a effect adjustment of the member 23 with respect to the part 24. A reel shaft 26 is mounted on forwardly extending members 23 in the bearings 27 provided thereon. The conventional reel 28 is secured on the reel shaft 26.

The power take-off shaft 17 of the tractor 16 supplies the power to operate the harvester. The power take-off shaft 17 is connected to a gear box 29 on the harvester body 13 by a sectional shaft 30. From this gear box 29 extend the various drives for the harvester. A chain 29a drives the endless conveyers 20 and 21 through conventional means, not shown, and the reel drive shaft 31, which consists of two telescoping sections 31a and 31b. The drive shaft 31 is journaled in bearings 32 which are secured on the forwardly extending arm 23, as shown in Figure 2. A set of gears 33 transmit power from the drive shaft 31 to the reel shaft 26.

A pick-up attachment 34 is mounted on the platform 18. This pick-up is of the type shown in detail in the Patent No. 1,815,327 to Raney et al. issued July 21, 1931. The pick-up 34 comprises a series of frame members 35 on which is journaled a shaft 36. The rear portions of the frame members 35 are bolted at 37 to the rear of the platform 18. The front of the frame members 35 have secured thereto a pair of plate members 38, only one of which is shown. A bracket 39 secured to the plate members 38 rests in the cutter bar 19 on the front of the platform 18. Bolts 40 on the frame members 35 are adjusted into contact with the lower surface of the platform 18 and rigidly hold the pick-up thereon. A shoe 41 is connected between the frame members 35 and rides on the ground. A series of fingers 42 are mounted on bars 42a which are mounted on the plate members 43 provided on the shaft 36. A strip deck 44 is disposed between the fingers 42 in the usual manner.

On the end of the shaft 36 of the pick-up 34 is secured a pulley 43. There is also provided on the reel shaft 26 a pulley 44. A twisted belt 45 is connected between the pulley 43 of the pick-up 34 and the pulley 44 of the reel shaft 26. It will be apparent from this that the reel shaft 26 driven from the chain 31 will transmit, through the belt 45, a drive in an opposite angular direction for the shaft 36 of the pick-up 34. The tension on the belt can be increased by adjusting the connection at 25.

From the foregoing description it will be apparent that a novel drive has been provided for the pick-up, and that the pick-up can be readily mounted on the header. The drive is easy to install and cheap to manufacture. The changeover can be made within a minimum time.

It is to be understood that only an illustrative embodiment of the invention has been shown and described, and that, obviously, the same is susceptible to many changes in form and location of parts without departing from the spirit and scope of the invention as indicated in the appended claims.

What is claimed is:

1. In combination, a harvester having a header, a pick-up attachment, means on the pick-up adapted to rest on the header, means for securing the pick-up to the header at a point spaced from the first mentioned means, and adjustable means on the pick-up adjustable against the header to hold the first mentioned means in engagement with the header.

2. In combination, a harvester having a header, a pick-up mounted on the header, said pick-up comprising a series of frame members extending beneath the header and secured thereto, bracket members on the pick-up adapted to rest on the header, and adjusting bolts on the frame members adapted to contact the underside of the header to hold the bracket members in engagement with the header.

BENJAMIN M. HYMAN.